United States Patent
Hussien et al.

(10) Patent No.: US 11,053,138 B2
(45) Date of Patent: Jul. 6, 2021

(54) METHOD OF REMOVING ARSENIC FROM A LIQUID

(71) Applicant: QATAR FOUNDATION FOR EDUCATION, SCIENCE AND COMMUNITY DEVELOPMENT, Doha (QA)

(72) Inventors: Muataz A. Hussien, Doha (QA); Ahmed Mohammed Fard, Doha (QA); Tarik Rhadfi, Doha (QA); Hugues Preud'Homme, Lons (FR); Marwan K. Khraisheh, Lexington, KY (US); Nidal Hilal, Swansea (GB)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 380 days.

(21) Appl. No.: 16/030,807

(22) Filed: Jul. 9, 2018

(65) Prior Publication Data
US 2019/0016609 A1   Jan. 17, 2019

Related U.S. Application Data

(60) Provisional application No. 62/531,148, filed on Jul. 11, 2017.

(51) Int. Cl.
*C02F 1/28* (2006.01)
*B01J 20/02* (2006.01)
(Continued)

(52) U.S. Cl.
CPC .......... *C02F 1/281* (2013.01); *B01J 20/0211* (2013.01); *B01J 20/0259* (2013.01);
(Continued)

(58) Field of Classification Search
None
See application file for complete search history.

(56) References Cited

U.S. PATENT DOCUMENTS

| | | | |
|---|---|---|---|
| 6,200,483 B1 * | 3/2001 | Cutler | B01J 47/00 210/685 |
| 7,608,190 B1 * | 10/2009 | Banerjee | B01J 20/0222 210/663 |

(Continued)

FOREIGN PATENT DOCUMENTS

| | | |
|---|---|---|
| CN | 103922289 A | 7/2014 |
| CN | 106268610 A | 1/2017 |

OTHER PUBLICATIONS

Ahmadun et al. Review of technologies for oil and gas produced water treatment. Journal of Hazardous Materials 170 (2009) 530-551. (Year: 2009).*

(Continued)

*Primary Examiner* — David C Mellon
(74) *Attorney, Agent, or Firm* — Nath, Goldberg & Meyer; Richard C. Litman

(57) ABSTRACT

A method for removing arsenic from a liquid includes adding a two-dimensional metal carbide adsorbent to the liquid to adsorb the arsenic from the liquid. The two-dimensional metal carbide adsorbent can include at least one MXene, having the formula $M_{n+1}X_n$, where n=1, 2 or 3, where M is an early transition metal, such as scandium (Sc), titanium (Ti), vanadium (V), chromium (Cr), yttrium (Y), zirconium (Zr), niobium (Nb), molybdenum (Mo) or the like, and X is either carbon or nitrogen. The MXene may be $Ti_3C_2$.

3 Claims, 15 Drawing Sheets

(51) Int. Cl.
*C01B 32/921* (2017.01)
*B01J 20/30* (2006.01)
*C02F 101/10* (2006.01)

(52) U.S. Cl.
CPC ....... *B01J 20/0274* (2013.01); *B01J 20/3085* (2013.01); *C01B 32/921* (2017.08); *C02F 2101/103* (2013.01)

(56) References Cited

U.S. PATENT DOCUMENTS

| | | | | |
|---|---|---|---|---|
| 8,709,259 | B2* | 4/2014 | Douglas, Sr. | C02F 9/00 210/721 |
| 2006/0091079 | A1* | 5/2006 | Meng | C02F 1/281 210/688 |
| 2009/0297885 | A1* | 12/2009 | Gadkaree | B01D 53/02 428/698 |
| 2013/0139446 | A1 | 6/2013 | Malik | |
| 2014/0069821 | A1* | 3/2014 | Marcin | C02F 9/00 205/498 |
| 2014/0162130 | A1* | 6/2014 | Barsoum | H01M 4/62 429/231.8 |
| 2016/0279596 | A1* | 9/2016 | Evans | B01J 20/0237 |
| 2017/0088429 | A1* | 3/2017 | Shin | C01B 32/921 |
| 2017/0294546 | A1* | 10/2017 | Ghidiu | C01B 32/949 |
| 2018/0108910 | A1* | 4/2018 | Barsoum | C30B 7/02 |

OTHER PUBLICATIONS

Peng et al. Unique Lead Adsorption Behavior of Activated Hydroxyl Group in Two-Dimensional Titanium Carbide. J. Am. Chem. Soc. 2014, 136, 4113-4116. (Year: 2014).*

Ling et al., "Flexible and conductive MXene films and nanocomposites with high capacitance," PNAS, vol. 111, No. 47, Nov. 25, 2014.

Ying et al., "Two-Dimensional Titanium Carbide for Efficiently Reductive Removal of Highly Toxic Chromium(VI) from Water," ACS Appl. Mater. Interfaces, 2015, 7 (3), pp. 1795-1803, Publication Date (Web): Jan. 5, 2015.

* cited by examiner

US 11,053,138 B2

METHOD OF REMOVING ARSENIC FROM A LIQUID

CROSS-REFERENCE TO RELATED APPLICATION

This application claims the benefit of U.S. Provisional Patent Application Ser. No. 62/531,148, filed on Jul. 11, 2017.

BACKGROUND OF THE INVENTION

1. Field

The disclosure of the present patent application relates to the removal of water contaminants, and particularly to removal of arsenic from water.

2. Description of the Related Art

Arsenic pollution in water is one of the most important ecological and health issues in the world today. Arsenic occurs naturally in the environment as a tasteless and odorless semi-metal element. Arsenic also can occur from anthropogenic sources, such as industrial and agricultural activities. The maximum acceptable contaminant level (MCL) of arsenic in drinking water is 10 µg/L. Exposure to arsenic is associated with numerous health problems, including a variety of different types of cancer, arsenicosis, and kidney, skin, and lung problems.

Arsenic in neutral water presents as an oxo-anion in two dominant forms, namely arsenite (As (III)) and arsenate (As (V)). As (III) is considered a hard acid and mostly forms complexes with oxides and nitrogen. As (V) acts as a soft acid, and mostly forms complexes with sulfides. The oxo-anion properties allow arsenic and its derivatives to interact with other metal hydroxide surfaces through formation of monodentate and bidentate inner surface complexes, providing a basis for arsenic removal by adsorption.

Coagulation, oxidation/chemical precipitation, ion-exchange filtration and reverse osmosis filtering are examples of known arsenic removal techniques from drinking water. All of these techniques, however, have numerous drawbacks and restrictions, thus limiting their scope of application. For example, chemical oxidation and precipitation are performed by the addition of chemical reagents, which is then followed by the separation of clean water and the precipitated solids. This method, however, results in byproducts from the reagent addition, as well as producing significant amounts of sludge. Reverse osmosis and other membrane filtration methods, such as ultrafiltration, are expensive processes, requiring high energy consumption. Ion-exchange filtration is known to release harmful chemicals into the environment. Thus, a method of removing arsenic from a liquid solving the aforementioned problems is desired.

SUMMARY

The method for removing arsenic from a liquid includes using at least one compound from a group of layered ternary carbides and nitrides, known as MAX phases, to adsorb arsenic from the liquid. MAX phases have the general formula $M_{n+1}AX_n$, where n=1, 2, or 3, where M is an early transition metal, such as scandium (Sc), titanium (Ti), vanadium (V), chromium (Cr), yttrium (Y), zirconium (Zr), niobium (Nb), molybdenum (Mo) or the like, A is an A-group element, such as aluminum (Al), silicon (Si), Indium (In), tin (Sn) or the like, and X is either carbon or nitrogen. Of the MAX phases, MXene, having the formula $M_{n+1}X_n$ is a preferred adsorbent. The MXene can be $Ti_3C_2$. For example, $Ti_3C_2$ can be added to contaminated water for adsorbing arsenic therefrom.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
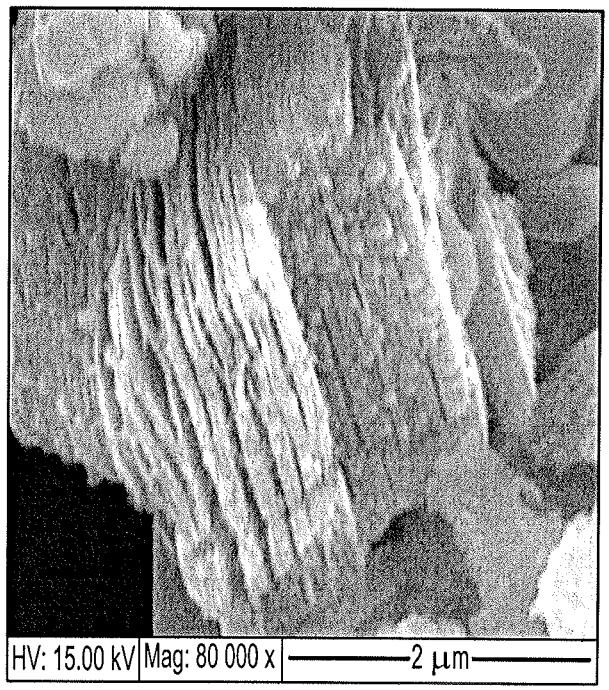
FIGS. 1A, 1B, 1C and 1D are scanning electron microscope (SEM) images of a $Ti_3C_2$ two-dimensional metal carbide adsorbent.
Figure 1B:
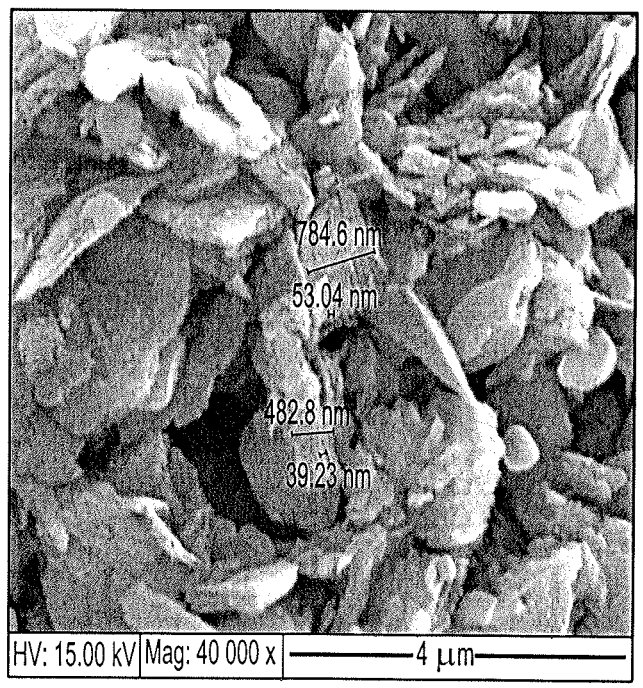
Figure 1C:
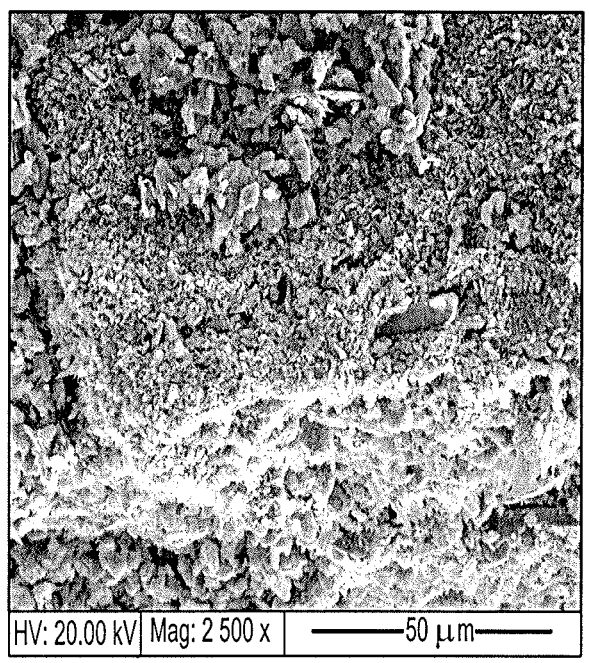
Figure 1D:
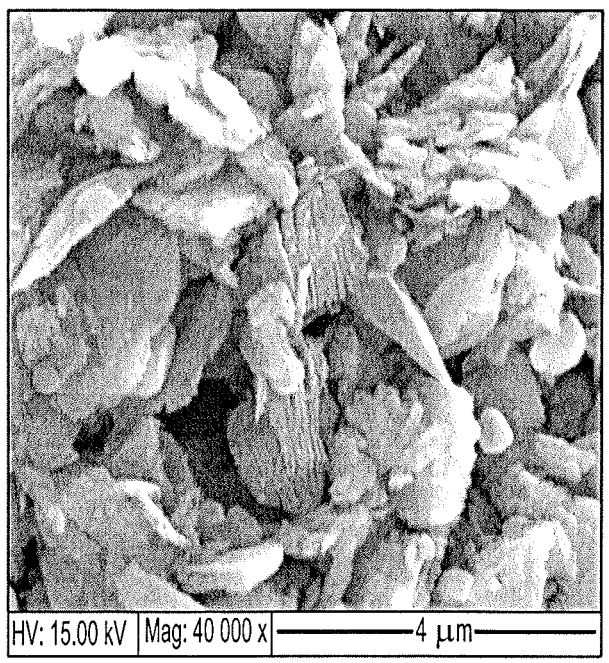

The method for removing arsenic from a liquid includes using an adsorbent including a two-dimensional nano material to adsorb arsenic from the liquid. The liquid can be water and arsenic can be present in the water as an oxo-anion in two dominant forms, namely arsenite (As (III)) and arsenate (As (V)). The two-dimensional nano material can include at least one compound from a group of layered ternary carbides and nitrides, known as MAX phases. MAX phases have the general formula $M_{n+1}AX_n$ where n=1, 2 or 3, where M is an early transition metal, such as scandium (Sc), titanium (Ti), vanadium (V), chromium (Cr), yttrium (Y), zirconium (Zr), niobium (Nb), molybdenum (Mo) or the like, A is an A-group element, such as aluminum (Al), silicon (Si), Indium (In), tin (Sn) or the like, and X is either carbon or nitrogen. Of the MAX phases, MXene, having the formula $M_{n+1}X_n$, is a preferred adsorbent of arsenic. MXenes are produced by selectively etching out the A element from a MAX phase.

MXenes have good structural and chemical stabilities, a large specific surface area, reducibility, good dispensability, hydrophilic surfaces, reversible adsorption properties, outstanding electrical conductivities, and are environmentally friendly. Of the MXene's, Titanium (III) Carbide (II) ($Ti_3C_2$) is a preferred two-dimensional metal carbide adsorbent. As described in detail below, $Ti_3C_2$ nanosheets can be prepared by an intercalation and exfoliation process. The $Ti_3C_2$ include nanosheets with few layers. The present inventors have found that when $Ti_3C_2$ is added to contaminated water, arsenic can be removed therefrom. The removal capacity can be 0.8 mg/g, with a residual concentration far below the standard limit (10 µg/L) set by the World Health Organization for drinking water. It has been further found that $Ti_3C_2$ can efficiently remove arsenic from water that is also contaminated with other heavy metals, such as chromium six (Cr (VI)) and lead (Pb (II)).

In experiment, the $Ti_3C_2$ adsorbent was prepared by room temperature exfoliation of $Ti_3AlC_2$ using hydrofluoric acid:

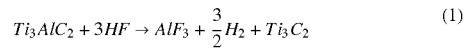

$$Ti_3AlC_2 + 3HF \rightarrow AlF_3 + \frac{3}{2}H_2 + Ti_3C_2 \quad (1)$$

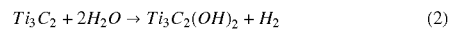

$$Ti_3C_2 + 2H_2O \rightarrow Ti_3C_2(OH)_2 + H_2 \quad (2)$$

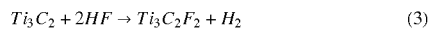

$$Ti_3C_2 + 2HF \rightarrow Ti_3C_2F_2 + H_2 \quad (3)$$

The MAX phase ($Ti_3AlC_2$) was synthesized by mixing commercial $Ti_2AlC$ and TiC in a 1:1 molar ratio using ball-milling for 20 h. The MAX phase was then sintered under an inert environment using a tube furnace up to 1300° C. with a heating rate of 5° C./min. The resulting powder is then exfoliated by 50 wt. % HF to selectively remove the Al layer from the sintered MAX phase (which is now changed to $Ti_3C_2T_x$). The agglomerated MXene ($Ti_3C_2T_x$) was then dispersed by dispersing $Ti_3C_2T_x$ powder in ethanol solution and ultra-sonication under argon for 1 h at 60% amplitude. The dispersed $Ti_3C_2T_x$ nanosheets were then collected using centrifugation and drying overnight. All chemicals used in this study were reagent grade. TraceCERT® (Sigma-Aldrich) 1000 mg/L As in nitric acid was used as the arsenic standard solution (Sigma-Aldrich). To adjust the pH of the solutions HCl and NaOH are used. 37% HCl solution from VWR AnalaR NORMAPUR (VWR International) was diluted to prepare a 0.1 M solution of HCl. A 0.1 M solution of NaOH is also used to adjust the pH using sodium hydroxide from VWR AnalaR NORMAPUR. In this context, and for the sake of simplicity, all $Ti_3C_2T_x$ notation has been replaced by MXene.

The $Ti_3C_2$ adsorbent was added to a sample of contaminated water and adsorption of the arsenic contaminant from the water was found to have a removal efficiency of up to 85%. The arsenic concentration in the water was analyzed using a Brucker Aurora Elite Inductive Coupled Plasma-Mass Spectrometer (ICP-MS). To prepare the samples for analysis, untreated and treated water samples were preserved and diluted 100 times with 1% w/w $HNO_3/H_2O$ prior to the testing. The arsenic concentration was analyzed in helium collision mode (67 ml/min) using a dwell time of 30 msec, 10 replicates and a plasma power of 1450 W.

Surface imaging of the MXene sample was performed using Field-emission scanning electron microscopy (FE-SEM) on a JEOL JSM-7610F (JEOL Inc. Japan) which was combined with EDS (OXFORD instruments, INCAx-Max20, United Kingdom) for elemental analysis. AXIS Ultra DLD X-ray photoelectron spectroscopy (XPS) was used to analyze the element compositions of samples and also to identify the oxidation states for each element with their surface chemical bonding. The zeta potentials of the MXene nanosheets were measured using Zetasizer (Nano ZS 90, Malvern Instruments Ltd., Malvern, UK) equipped with a 4.0 mW internal laser, which works on the principle of dynamic light scattering (DLS). The zeta potential measurements were performed at room temperature (25° C.), with a scattering angle of 90°.

Figure 9:
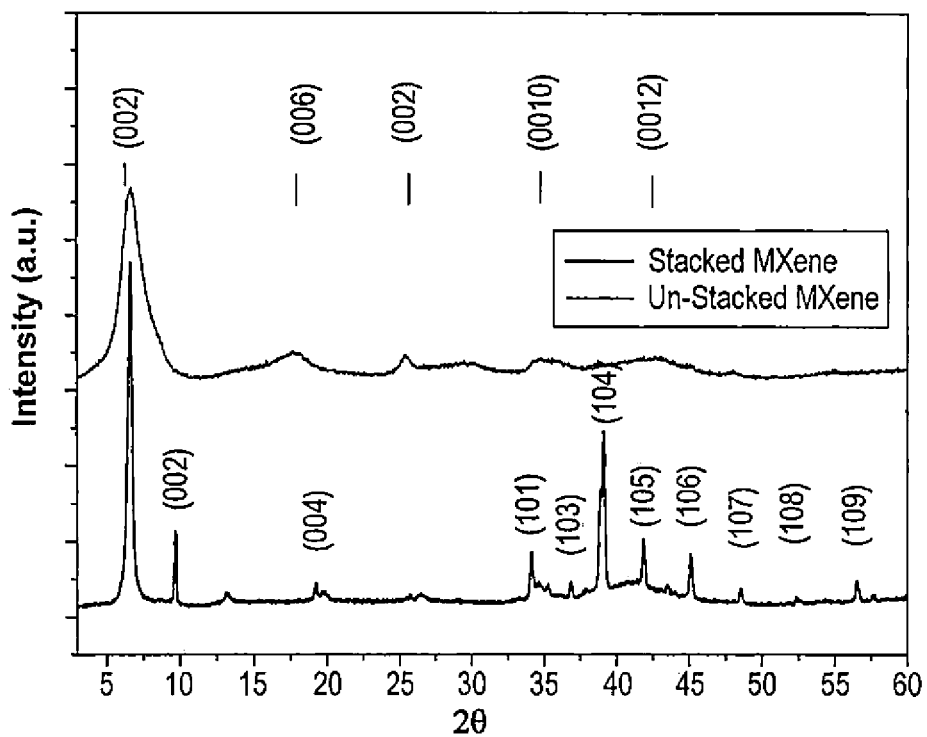
FIG. 9 is graph comparing X-ray diffraction (XRD) patterns of the $Ti_3C_2$ two-dimensional metal carbide adsorbent before exfoliation (i.e., a stacked MXene) and following exfoliation (i.e., an un-stacked MXene) thereof.

Powder X-ray diffraction (XRD) patterns were recorded using a MiniFlex X-ray diffractometer manufactured by the Rigaku® Americas Corporation of Texas. The powder X-Ray diffraction patterns were measured with Cu Kα radiation at λ=1.54 Å at a rate of 0.4%, over Bragg angles ranging between 10-90°. The operating voltage and current were maintained at 40 kV and 15 mA, respectively. FIG. 9 shows X-ray diffraction (XRD) patterns for MXene samples prior to exfoliation (i.e., "stacked" MXene samples) and for MXene samples following exfoliation (i.e., "un-stacked" MXene samples). In FIG. 9, the peaks at 6.6°, 9°, 19° and 38° of the stacked MXene corresponds to $Ti_3AlC_2$. When the MXene is exfoliated, however, the peak at 6.6° gets broader and the peaks at 9° and 38° fade due to the formation of $TiO_2$ nanoparticles on the surface of the MXene. The XRD peaks at 25.5°, 45°, 47° and 52.5° on the stacked MXene. XRD patterns are for the $TiO_2$ nanoparticles. The peaks at 25.5° and 45° on the un-stacked MXene are shifted to 25° and 42.5°, respectively, due to a loss of the diffraction signal in the out-of-plane direction after exfoliation that causes a broadening of the non-polar shape of the MXene nanosheet. Aluminum (Al) impurities are also evident at 25.5°, 34°, 36° and 41°.

The adsorption capacity of the $Ti_3C_2$ adsorbent to adsorb arsenic was evaluated using batch tests at different pH values, ranging from 3 to 8. 10 mL of ultra-pure water contaminated with 1 ppm (1 mg/L) of arsenic (in the form of $NaAsO_2$), was mixed with 10 mg of the $Ti_3C_2$ adsorbent and left for 24 hours. The solution was mixed with a magnetic shaker at room temperature. One sample was taken immediately after 20 seconds of rigorous shaking, and other samples were taken, respectively, after 10 minutes, 30 minutes, 60 minutes, 90 minutes, 120 minutes and 1,440 minutes to determine the optimum contact time. At each sampling interval, 100 μL of solution were taken and centrifuged using a micro-centrifuge at a speed of 3,000 rpm for 5 minutes. The filtrate was taken for analysis using inductively coupled plasma mass spectrometry (ICP-MS) (BRUCKER AURORA ELITE COUPLED PLASMA-MASS SPECTROPHOTOMETER). The samples, taken at the different times given above, were dosed and preserved with 1:3 $HNO_3/H_2O$ prior to the testing.

The pH of the solution was adjusted using 0.1 M HCl and 0.1 M NaOH solutions to study the effect of pH on adsorption capacity and removal efficiency. Different MXene loadings in 50 ml polypropylene conical tubes containing 20 ml arsenic solution with concentration of 1 ppm were used. The tubes were shaken using a mechanical shaker at a speed of 100 rpm. In the second part of the experiments, the effect of contact time on the removal efficiency of arsenic by MXene was examined using 1 ppm arsenic solution, 100 mg MXene and different pH values. Samples at different time intervals were collected and analyzed for arsenic using ICP-MS. After measuring the initial pH of the solution, an acid or a base was added drop-by-drop to achieve a pH of 3, 5, 6 or 8. A similar protocol was used to adjust the pH of the solution using a trimethylamine organic base.

Adsorption capacity (AC) and removal efficiency (RE) of arsenic in the solution by the $Ti_3C_2$ water contaminant adsorbent were found and expressed mathematically as $$AC = \frac{(C_i - C_f) \times V}{W_g} \text{ and } RE\,(\%) = \frac{(C_i - C_f)}{C_i} \times 100,$$

where $C_i$ (mg/L) is the initial concentration of arsenic in the solution, $C_f$ (mg/L) is the final concentration of arsenic in the solution, V (L) is the volume of the solution containing arsenic, and $W_g$ is the amount of the $Ti_3C_2$ arsenic adsorbent in the solution. As noted above, the arsenic analysis was conducted using inductively coupled plasma mass spectrometry. The samples, taken at the different times given above, were dosed and preserved with 1:3 $HNO_3/H_2O$ prior to the testing.

Scanning electron microscopy (SEM) was performed using FEI QUANTA 200 ENVIRONMENTAL SCANNING ELECTRON MICROSCOPE (ESEM) with a resolution of 5 nm and a magnification of ×200K to observe the morphology and structure of material. Samples were kept on aluminum stub and gold sputtered prior to imaging. AXIS Ultra DLD X-ray photoelectron spectroscopy (XPS) was used to analyze samples for elements on the surface and also to identify the oxidation sheets for each element with their surface chemical bonding.

The measurement of zeta potential and particle size of the nanoparticles was carried out using a ZETASIZER (NANO ZS 90, Malvern Instruments Ltd., Malvern UK) equipped with a 4.0 mW internal laser, which works on the principle of dynamic light scattering (DLS). The measurements were performed at room temperature (25° C.), with scattering angle of 90°. The intensity-weighed mean diameter of the bulk population of particles was given by the z-average diameter value of the particles.

FIGS. 1A-1D are scanning electron microscope (SEM) images of $Ti_3C_2$ MXene particles produced as described above, specifically showing the $Ti_3C_2$ layers spread apart due to the exfoliation treatment by the hydrofluoric acid. The appearance of "book"-like layers is caused by etching away the Al layers in the initial $Ti_3AlC_2$ particles. This is a clear indication of delamination, which is typical of MXenes. The gaps are typically between 30 nm and 100 nm. The thickness of each MXene layer is approximately 40-50 nm (best seen in the high magnification images of FIGS. 1B and 1D). It can be seen that the MXene contains few lamellar grains with densely aligned layered structures. It is believed that these grains are residual $AlF_3$ particles and/or $TiO_2$ nanoparticles. There are two different types of structures for MXenes which can be observed for a two-dimensional (2D) layered edge. One type of structure is in the form of sheets with a small ball attachment and the other is "clean," without the ball. It is believed that the ball-like structures may also be MXene sheets, but ones which nucleated and grew from the hydrofluoric acid (HF) treatment. Elemental analysis performed by X-ray photoelectron spectroscopy (XPS) confirmed this. SEM-EDS analysis revealed the distribution of the elemental composition on the MXene surface. From the analysis, 61% of the weight of the sample is Ti and C and the rest are impurities such as F, Al, Cl, etc., produced during the exfoliation and the unstacking process.

Figure 2:
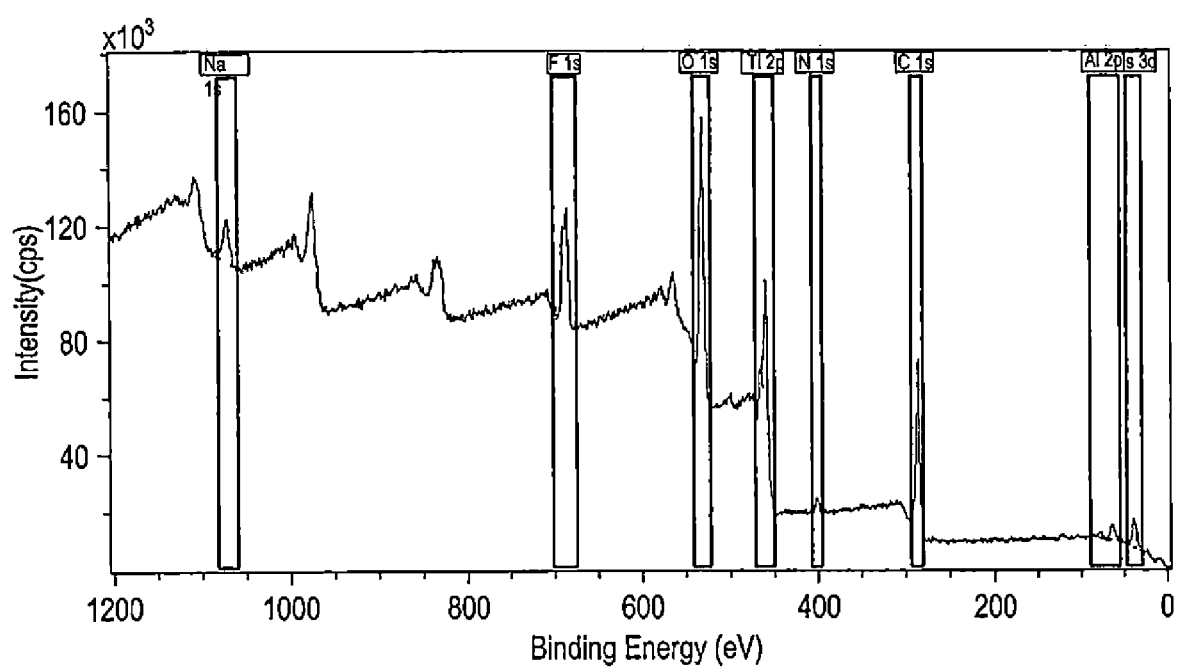
FIG. 2 is a graph illustrating X-ray photoelectron spectroscopy (XPS) results for the $Ti_3C_2$ two-dimensional metal carbide adsorbent following adsorption of arsenic thereby.

The 2p XPS analysis of the $Ti_3C_2$ MXene after arsenic adsorption (pH 6) is shown in FIG. 2. As shown, apart from peaks for Ti, C, Al and F, there are peaks for Na and As. The presence of Na is due to the addition of NaOH to the solution to control the pH, and the As peak is for adsorption of arsenic on the surface of the $Ti_3C_2$ MXene. The concentration of Ti, C, O, Na, Al, and As are calculated to be 18%, 20%, 19%, 3%, 12% and 12.5%, respectively. Most of the concentrations of F and Al are mainly due to formation of $AlF_3$ nanoparticles during the etching process of the initial $Ti_3AlC_2$.

Figure 3A:
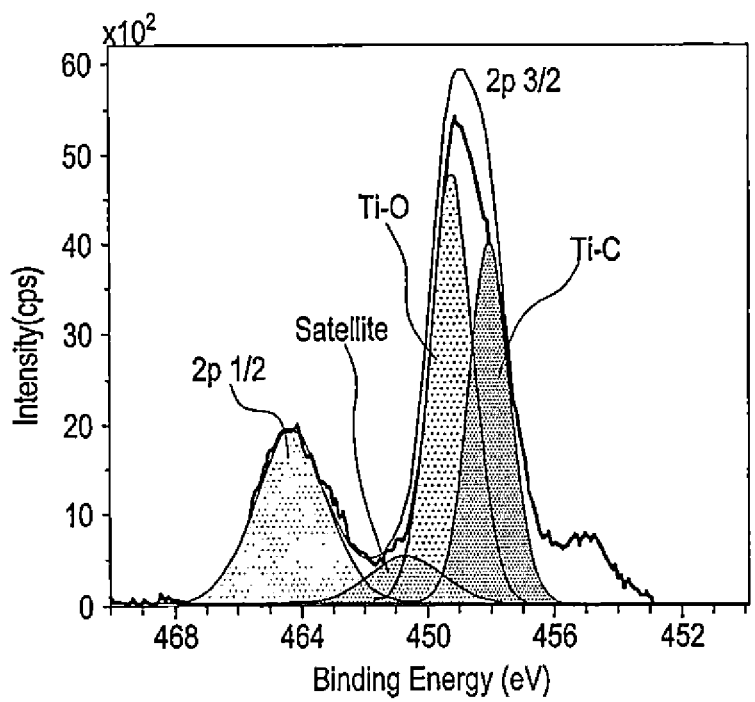
FIG. 3A is a graph showing titanium peaks of the X-ray photoelectron spectroscopy analysis of FIG. 2.
Figure 3B:
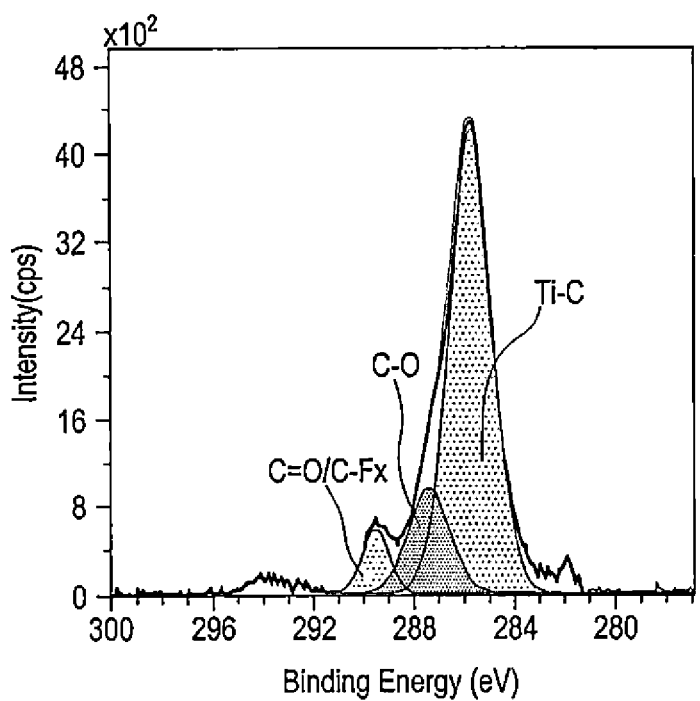
FIG. 3B is a graph showing carbon peaks of the X-ray photoelectron spectroscopy analysis of FIG. 2.

From the spectra shown in FIG. 3A, titanium existed both as titanium bonded to carbon (in the form of titanium carbide) and titanium oxide. The presence of Ti—O bonds is evidence of formation of $Ti_3C_2(OH)_2$ in solution. The presence of an OH group also can be seen in the 0 is main signal (shown in FIG. 3C). As shown in FIG. 3B C—O, C—Ti and C=O/C=$F_x$ are the three main peaks observed in the XPS analysis.

Figure 4:
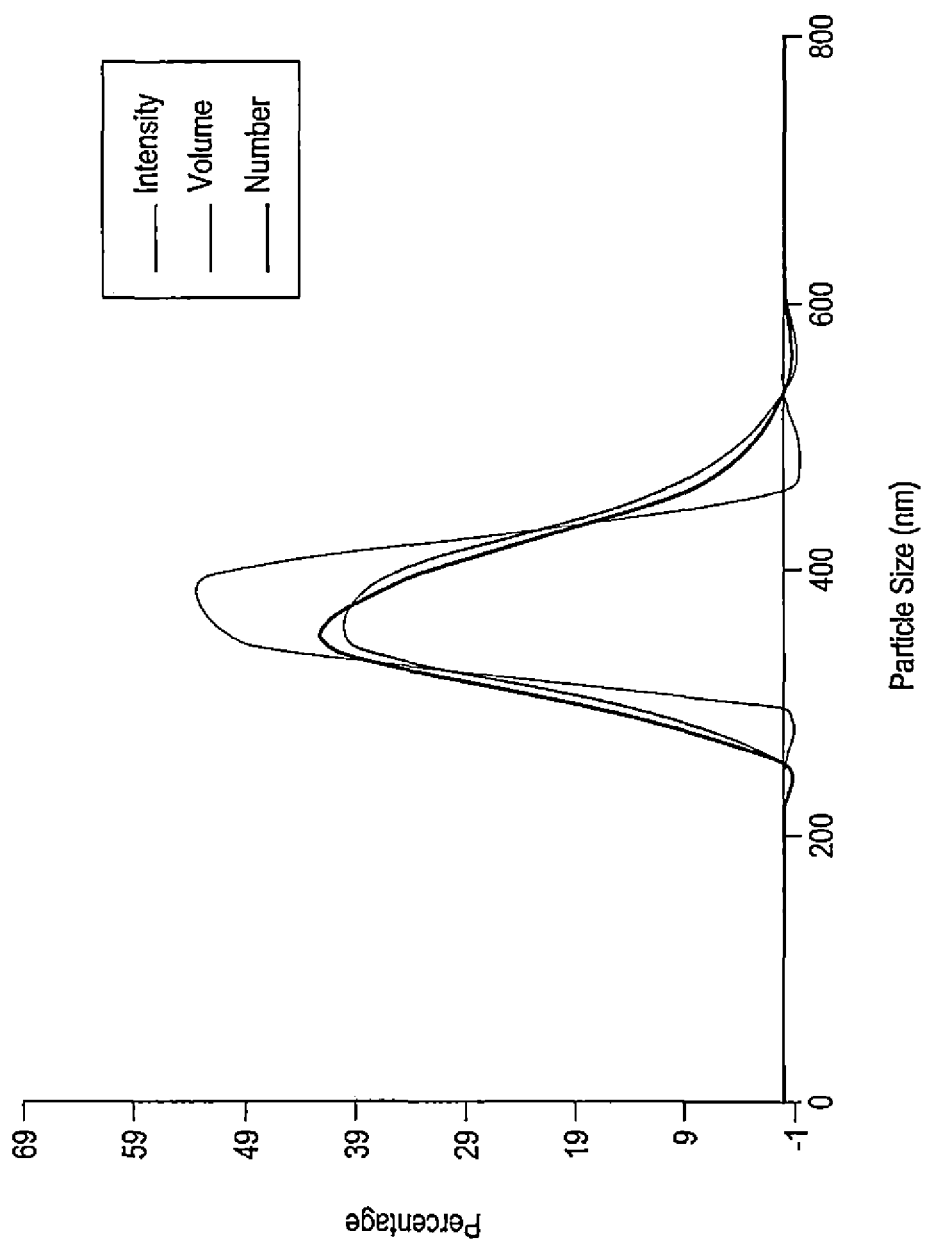
FIG. 4 is a graph showing particle size distribution of the $Ti_3C_2$ two-dimensional metal carbide adsorbent.

An analysis of particle size and zeta potential was performed by observing the change in size and potential of the $Ti_3C_2$ MXene. The average particle size of the $Ti_3C_2$ MXene is shown in FIG. 4. The particle size distribution was calculated by intensity percentage, volume percentage, and particle number. The mean particle size of the $Ti_3C_2$ MXene was found to be about 400 nm. An MXene particle of this size is loose in structure and is easily crushed and ground into powder.

Figure 5:
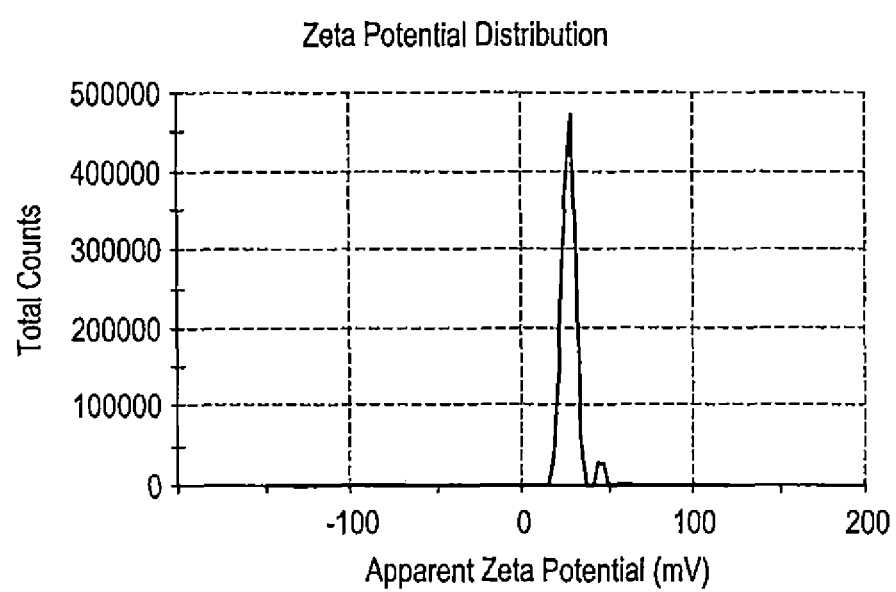
FIG. 5 is a graph showing zeta potential analysis of the $Ti_3C_2$ two-dimensional metal carbide adsorbent.

The zeta potential of the $Ti_3C_2$ MXene is shown in FIG. 5. The zeta potential analysis provides the magnitude and a measure of the effective surface charge density associated with the double layer around the particle. It can be seen in FIG. 5 that the $Ti_3C_2$ MXene is positively charged in solution, with the existence of a repulsive electrostatic interaction in the aqueous medium.

Figure 10:
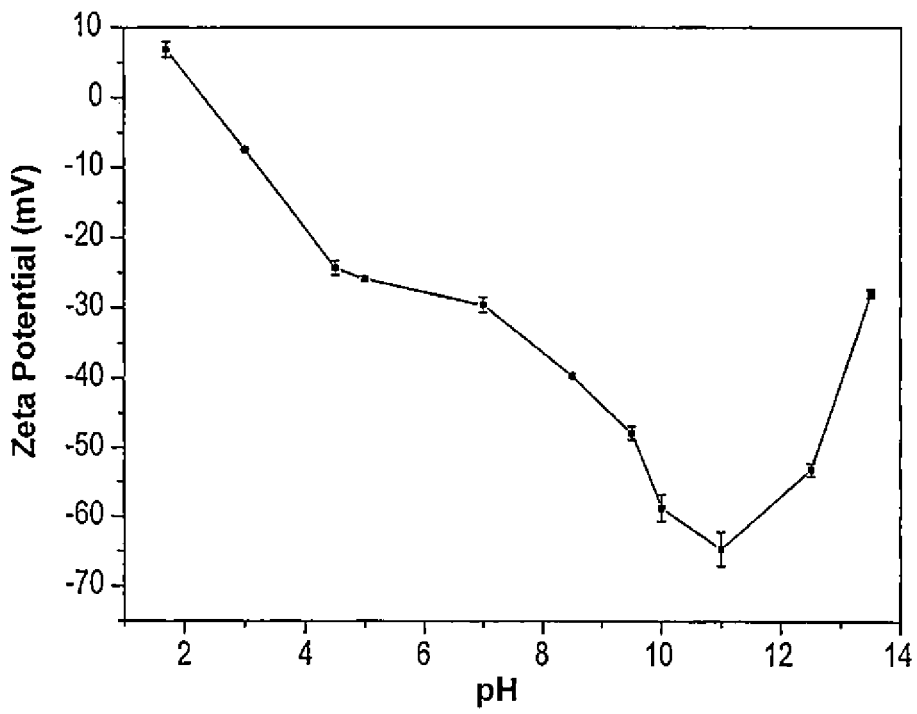
FIG. 10 is a plot showing the results of a zeta potential analysis on the $Ti_3C_2$ two-dimensional metal carbide adsorbent for differing values of pH.

Analysis of the zeta potential was also performed by observing the change in surface charge as function of pH. The pH-dependent zeta potential analysis of the MXene is shown in FIG. 10. The zeta potential analysis plot of FIG. 10 gives the measure of the effective surface charge density associated with the double layer around the particle. As shown, the MXene at a pH below 2.41 is positively charged and its sign changes to negative at a pH above 2.41, indicating the isoelectric point or point of zero charge (PZC)

occurs at a pH of 2.41, where the MXene is neutral. It is believed that the presence of protonated hydroxyl groups is the main cause of the positive sign of the MXene at a pH below 2.41. The hydroxyl groups keep decreasing by increasing the pH, which proportionally increases the negative sign of the MXene's zeta potential. The zeta potential of the MXene keeps decreasing (increase in negative sign of zeta potential) by increasing the pH up to a pH of 11, where the MXene surface charge again increases (decrease in negative sign of zeta potential).

The sudden change in the sign of the zeta potential may be due to the desorption of arsenic (As) ions from the surface of the MXene. The adsorption of As ions is more dominant in a neutral environment compared to a basic environment. Thus, when arsenic is desorbed from the MXene's surface, the surface of the MXene becomes less negative. When arsenic ions are adsorbed on the surface of the MXene, the electrical double layer interactions cause a heterogeneous distribution of charges on the surface which, in turn, causes a reduction on the effect of the double layer repulsion during the adsorption process.

Changes in the zeta potential from adjusting the pH can be usefully utilized for MXene regeneration. As shown in FIG. 10, at pH values above 8, there is not much adsorption taking place between the MXene and the As ions. The main reason for this may be due to the presence of Na ions in the solution at elevated pH. The presence of Na ions creates competition between As ions and Na ions (or $NH_4OH$) and, therefore, reduces the adsorption of As on the surface of the MXene. In order to regenerate the MXene, the spent MXene is washed with 0.1 M NaOH at a pH above 11 and then it is washed with de-ionized water (DI) water 4-5 times. The powder is then centrifuged and the supernatant is freeze-dried and reused. The adsorption capacity of the MXene remained unchanged after three regeneration cycles.

Figure 6A:
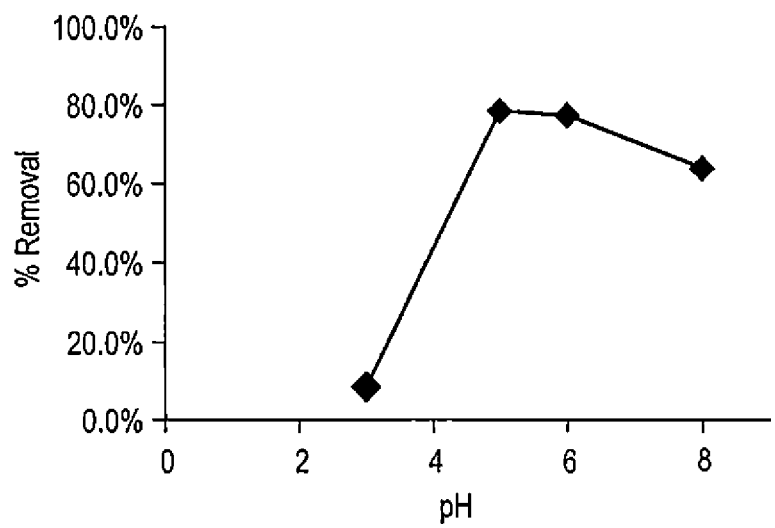
FIG. 6A is a graph showing the removal efficiency of the $Ti_3C_2$ two-dimensional metal carbide adsorbent for arsenic.
Figure 6B:
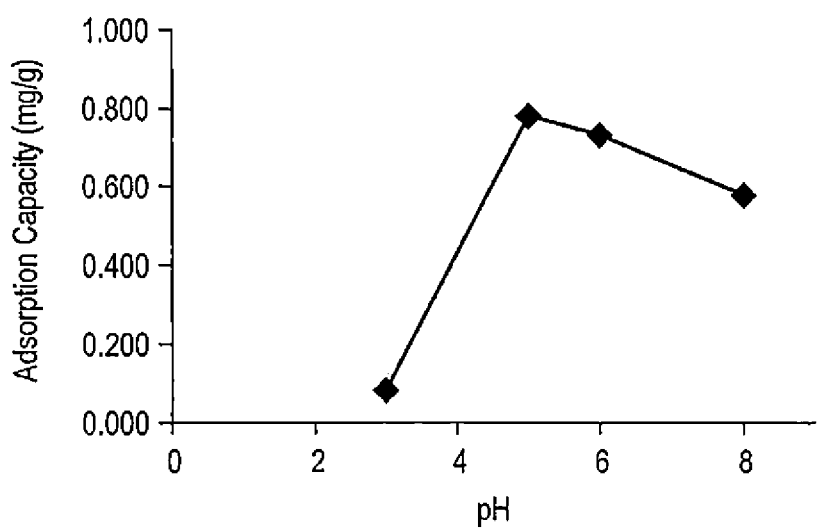
FIG. 6B is a graph showing the adsorption capacity of the $Ti_3C_2$ two-dimensional metal carbide adsorbent for arsenic.

The pH value of the $Ti_3C_2$ MXene in solution ranges between 3.5 and 3.7. This is in contrast to other carbon adsorbents, such as activated carbon or carbon nanotubes, where the pH is mostly in the range of 5-7. The pH of the medium is an important factor which significantly affects arsenic removal. FIG. 6A shows the effect of different pH values on the removal efficiency of arsenic, and FIG. 6B shows adsorption capacity of the $Ti_3C_2$ MXene as a function of pH of the medium after two hours. One can see that removal and adsorption of arsenic is pH dependent. As can be clearly seen, adsorption increased by increasing pH up to a point, and then drops thereafter. The maximum adsorption occurred at a pH of 5 and then dropped slightly at a pH of 6. These results can indicate that a higher surface area does not necessarily mean a higher adsorption capacity. In other words, the surface area might not be the primary parameter in adsorption by the MXene.

Figure 3C:
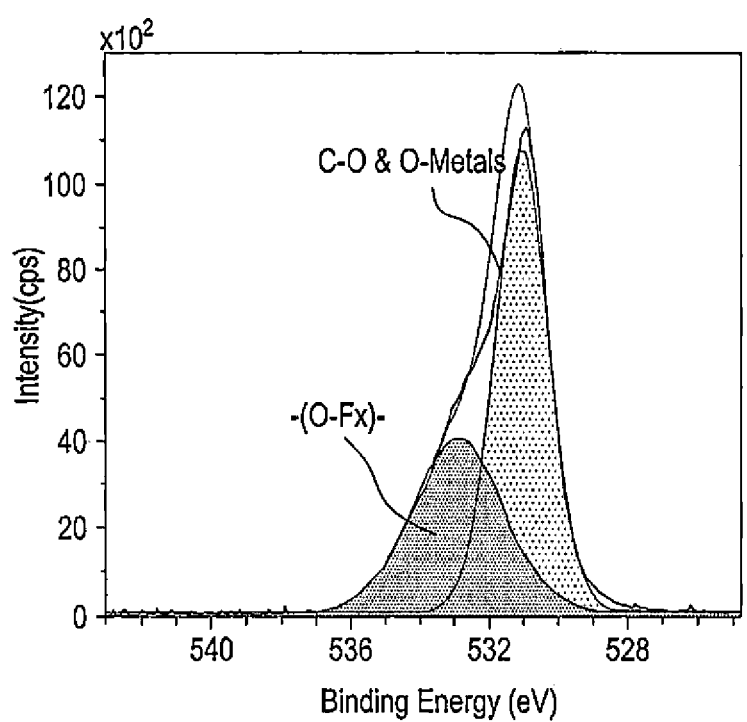
FIG. 3C is a graph showing oxygen peaks of the X-ray photoelectron spectroscopy analysis of FIG. 2.

It is possible that pH can affect the As (III) speciation and the MXene surface charge in the liquid medium. It is predicted that the MXene possesses positive charge density at low pH and then changes to a negative charge density at higher pH values. The As (III) in aqueous media also shows similar characteristics, where their surface charges change with a changing pH. Thus, As (III) adsorption varies with a changing value of pH. This phenomenon occurs due to electrostatic attraction between the negatively charged surface of the adsorbent and the positively charged As (III). ICP-MS results show that at a pH of 3 and at a pH of 8, Ti residual is higher than that of mid-range pH. It is believed that at a very low pH and a very basic pH, the Ti may separate from the MXene structure, causing damage. Thus, the optimal pH for the MXene solution is about 5. The pH of 5 for the MXene solution is improved by the Ti—O bond, which shows high sorption affinity toward metallic ions. The As (III) is partly attached to the surface of the MXene by covalent bonds with the Ti—O bond, forming Ti—O—As (III), as shown in FIG. 3C.

Figure 7:
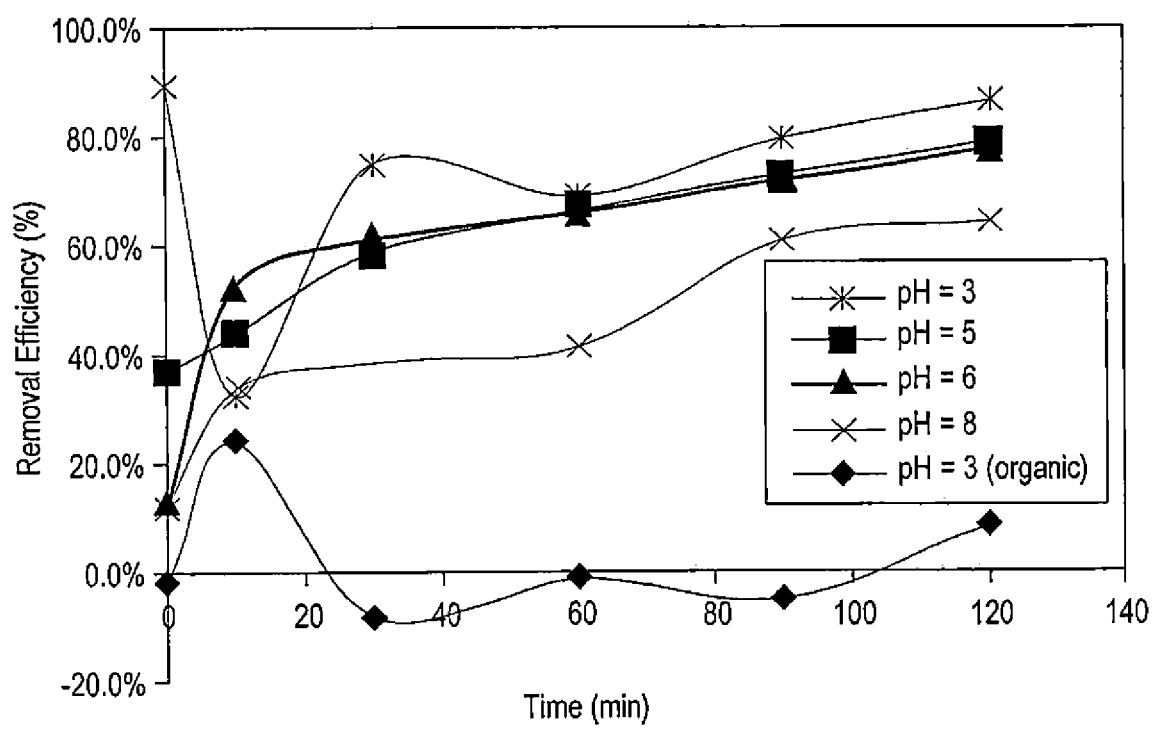
FIG. 7 is a graph illustrating the kinetics of arsenic removal by the $Ti_3C_2$ two-dimensional metal carbide adsorbent at different values of aqueous solution pH.

Kinetic experiments were carried out by determining the As (III) solution contents at various time intervals. The contact time was varied from 0 hours to 2 hours using 10 mg of the $Ti_3C_2$ MXene with an initial As (III) concentration of 1 mg/L (1 ppm). FIG. 7 shows the results of the kinetic tests at different pH values. More than 78% of As (III) was removed after two hours of contact at pH values of 5 and 6. There are no significant differences in removal of As (III) at both pH values of 5 and 6. By contrast, activated carbon requires at least a few hours of contact time to remove a similar percentage of arsenic.

Using an organic base to adjust the pH of the solution proved to show better performance in removing As (III), as shown in FIG. 7. The removal reached up to 85% just after contacting with MXene with very high kinetics. These rapid kinetics are mainly due to the distinctive layered nanostructure of MXene, which are favorable for the accessibility of As (III) intercalation and diffusion. In general, MXene shows excellent kinetics, with almost 40% of As (III) being removed just after dosing. FIG. 7 clearly shows that the removal rate of As (III) is pH-dependent. The lower the pH, the quicker the removal rate is. The As (III) removal capacity is reduced with an increase of pH value.

Figure 8:
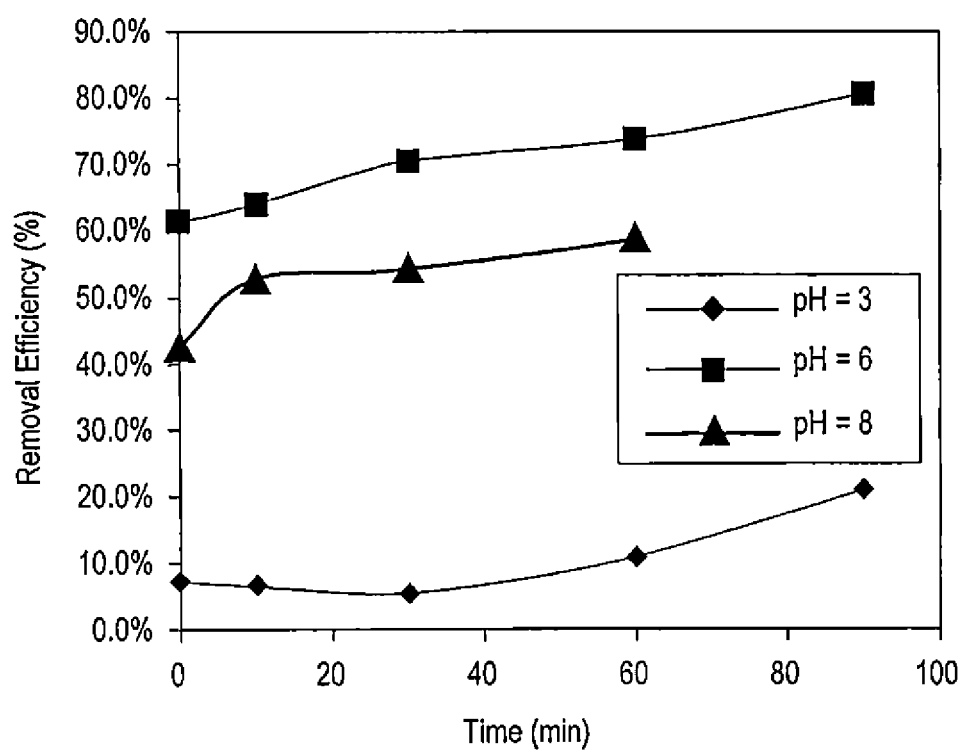
FIG. 8 is a graph showing removal efficiency of the $Ti_3C_2$ two-dimensional metal carbide arsenic adsorbent for arsenic in a solution including lead (II) and chromium (VI) as well as arsenic.

In order to examine the potential of interaction between arsenic and other elements in mixed solution with the MXene, another set of experiments were performed under optimized condition. Two other heavy metals, namely lead (Pb) and chromium (Cr (VI)), were tested. The influence of these elements on adsorption of arsenic can be seen in FIG. 8.

Figure 11A:
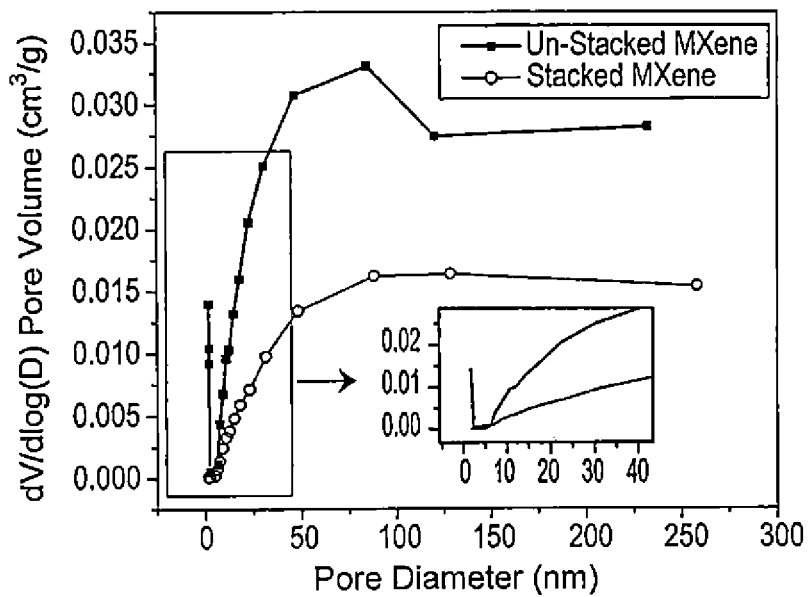
FIG. 11A is a plot comparing pore size distribution of the $Ti_3C_2$ two-dimensional metal carbide adsorbent before exfoliation (i.e., a stacked MXene) and following exfoliation (i.e., an un-stacked MXene) thereof.
Figure 11B:
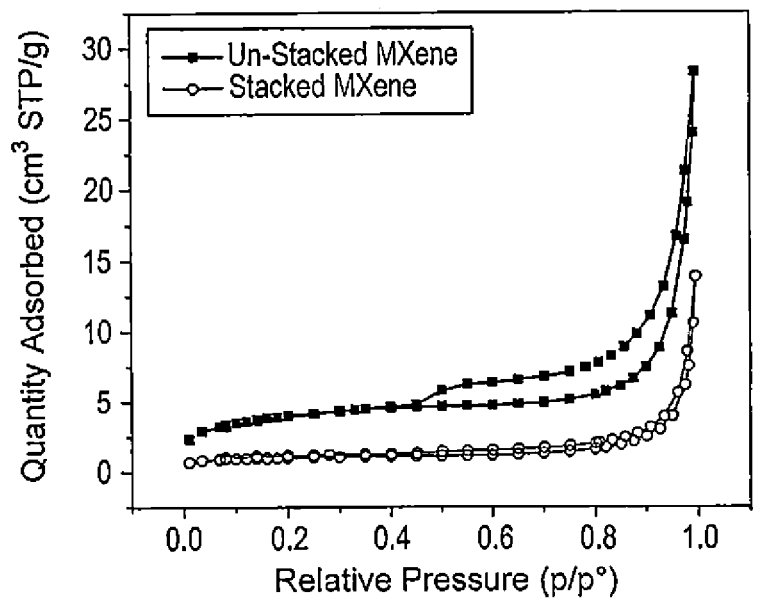
FIG. 11B is a plot comparing adsorption-desorption isotherms of the $Ti_3C_2$ two-dimensional metal carbide adsorbent before exfoliation (i.e., a stacked MXene) and following exfoliation (i.e., an un-stacked MXene) thereof, using $N_2$ at 77 K.

Additionally, the porous structure of $Ti_3C2T_x$ was analyzed using the adsorption-desorption of liquid $N_2$ at 77 K. The specific surface area of delaminated $Ti_3C_2T_x$ increases sharply with sonication from 3.5 $m^2/g$ to 13 $m^2/g$ due to the unstacking of Mxene layers. Unstacking of the MXene layers provide extra surface area (i.e., extra active sites) for adsorption of arsenic ions. The adsorption-desorption isotherms are shown in FIGS. 11A and 11B. As shown, the adsorption-desorption isotherm of the MXene follows the type IV nitrogen adsorption isotherm, exhibiting a clear hysteresis loop representing mesoporous slit-shaped pores. The slit-shaped pores are formed due to the multi-layer 2D parallel structure of $Ti_3C_2T_x$ and signify the mesoporous nature of the MXene. The average pore diameter of $Ti_3C_2T_x$ found from the Barrett-Joyner-Halenda (BJH) isotherm in FIG. 11B ranges between 10 nm to 220 nm, with the majority of the pore diameters being in the range of 100 nm. The stacking of the MXene did not significantly improve the pore size distribution of the MXene, as can be seen in FIG. 11B.

Figure 12:
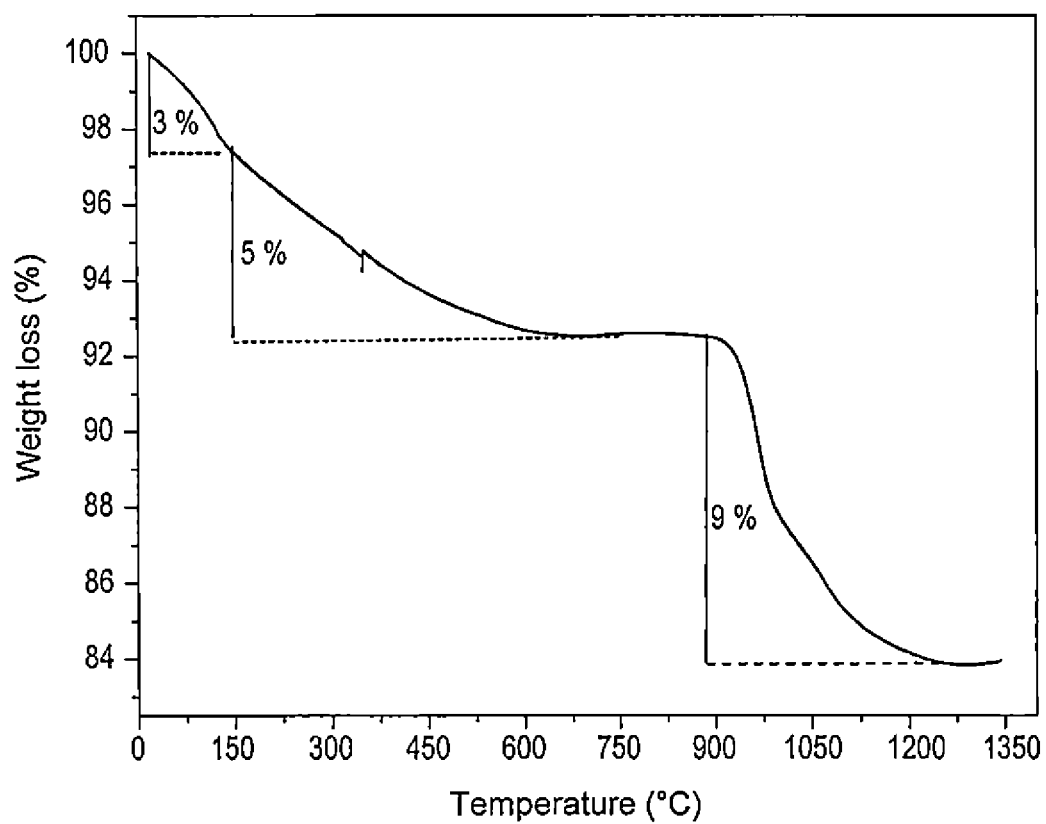
FIG. 12 is a graph showing the thermogravimetric analysis (TGA) curve for the $Ti_3C_2$ two-dimensional metal carbide adsorbent, comparing weight loss percentage against temperature.

To investigate the physical and chemical properties of the MXene with respect to temperature, thermogravimetric analysis (TGA) with a heating rate of 10° C./min in air and nitrogen was used. TGA was performed using an SDT Q600 manufactured by TA Instruments of Delaware. The thermogravimetric analysis (TGA) and differential thermal analysis (DTA) curve of $Ti_3C_2T_x$ is shown in FIG. 12. The analysis was performed under argon from room temperature to 1350° C. As shown in FIG. 12, the thermal characteristics of $Ti_3C_2T_x$ are divided into three different stages. The first stage, which starts from room temperature up to 200° C., is associated with loss of water, moisture, gases such as $O_2$, and solvents which are physically attached to the surface of $Ti_3C_2T_x$. The weight loss corresponding to this stage is around 3-4% of the original weight of the sample. The second stage is associated with 5% weight loss and ranges from 300° C. to 650° C. The weight loss in this step is due to the loss of a hydroxyl group (—OH) from the surface of the MXene. The third and last stage, which ranges from 650° C. to 1350° C., is associated with a weight loss of about 9%, and is due to the reduction of $TiO_2$ to form metallic Ti.

Figure 13A:
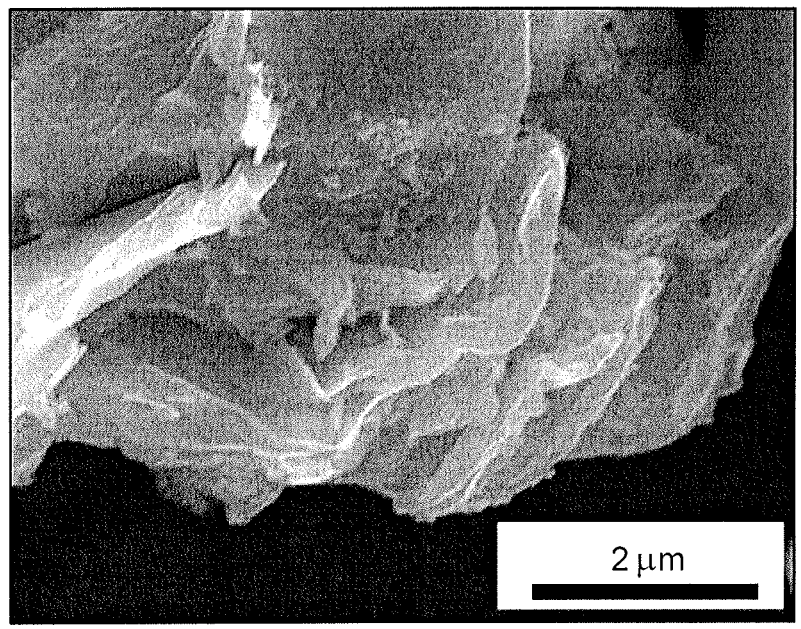
FIG. 13A is a scanning electron microscope (SEM) image of the $Ti_3C_2$ two-dimensional metal carbide adsorbent prior to its usage as an arsenic adsorbent.
Figure 13B:
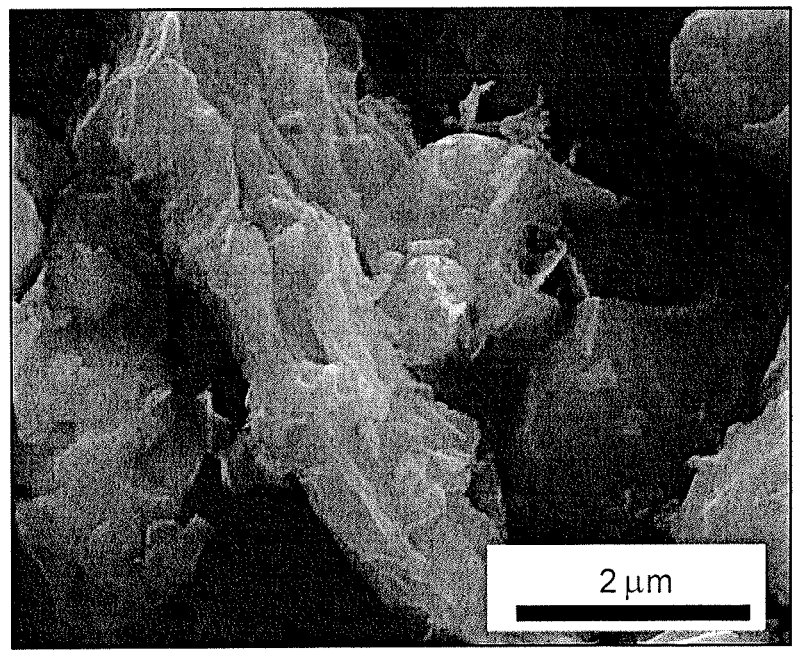
FIG. 13B is a scanning electron microscope (SEM) image of the $Ti_3C_2$ two-dimensional metal carbide adsorbent following adsorption of arsenic thereby.

Further, field-emission gun scanning electron microscope (FEG-SEM) images of the MXene samples, both before and after adsorption by arsenic ions, are respectively shown in FIGS. 13A and 13B. FIGS. 13A and 13B clearly illustrate the lamellar nature of the materials and their excellent stability after the arsenic removal test. Adsorption of As ions on the regions with higher oxygen content is higher.

As noted above, the adsorption of arsenic from water is highly pH-dependent. Arsenic adsorption is highly dependent on pH, where maximum adsorption occurs in the highly acidic pH range. Adsorption of arsenic keeps decreasing as the pH values of the solution increase, where the minimum adsorption occurs at a pH of 8. This can be correlated to the zeta potential of the MXene in a water environment. As described above with reference to FIG. 10, the MXene is positively charged below a pH of 2.41 and then changes to a negative charge at higher pH. On the other hand, arsenic is protonated at the lower pH. Thus, when the pH is less than 6, the anionic arsenic is dominant in the water ($H_3AsO_4$, $HAsO_4^{2-}$, and $H_2AsO_4^-$) but in the pH range above 6, arsenic species such as $HAsO_4^{2-}$ and $AsO_4^{3-}$ are the dominant species. Therefore, at low pH, positively charged MXene can attract more negatively charged arsenic species.

In the pH range of 2-3, $H_3AsO_4$ and $H_2AsO^{4-}$ are the dominant arsenic species, while as the pH increases to 6, $H_2AsO^{4-}$ and $HAsO_4^{2-}$ are the main arsenic species in water. At higher basic pH, arsenic species such as $HAsO_4^{2-}$ and $AsO_4^{3-}$ are the dominant species. Therefore, at a pH less than pHZPC (2.41), the surface of MXene is positively charged and tends to attract negatively charged arsenic species. On the other hand, when the pH goes above the $pH_{ZPC}$, the hydroxyl group on the surface of the MXene gets deprotonated and become negatively charged. This change in charge causes less adsorption for the arsenic species in water. The final arsenic concentration decreases with increasing adsorbent dosage. The maximum removal of arsenic using the MXene was obtained at 100 mg.

MXene dosage is another important factor which plays a major role in the arsenic uptake and can control the capacity of MXene at a given concentration. The removal efficiency of arsenic by MXene increases with increasing adsorbent dosage. The maximum removal efficiency was found to be at pH 3 with 100 mg of MXene. As a general rule, as the amount of adsorbent increases, the free adsorption sites on the surface of adsorbent available for the removal of contaminants increases proportionally. Further, in the case of MXene, after the exfoliation process by HF, MXene's surface is terminated mainly by OH, F, and O groups. These functional groups, along with the free adsorption sites on the surface of MXene, provide environments for ions to be adsorbed freely on the surface of MXene, either by chemical bonding between functional groups on the surface of MXene and the ions (chemisorption) or physically by van der Waal forces (physisorption). The chemical bonding between arsenic ions and functional groups was illustrated in the XPS analysis shown in FIG. 2.

As shown in the SEM images in FIGS. 1A-1D, the sheet-like structure of MXene helps ions to be adsorbed within the sheet through an intercalation process. This could be the second adsorption route, where arsenic is adsorbed by MXene and is sandwiched between the un-stacked (i.e., prior to exfoliation) MXene layers. As shown in the XPS analysis, the 002 peak of MXene shifts to a lower angle and becomes broader, causing an increase in the d-spacing between the MXene sheets. The etching process results in decreasing the thickness of the MXene sheets and consequently increasing the interlayer distance between each MXene layer. The interlayer distance between each MXene sheet is estimated to be in the range of 7-20 Å, depending on the extent of exfoliation and the type of acid used to exfoliate the MAX phase. Comparing the atomic radius of arsenic, which is around 114 pm, to the inter-layer distance between MXene sheets, it can be concluded that some of the arsenic ions are intercalated within the MXene layers, either chemically or physically.

The third and last possible route for arsenic adsorption is through an ion-exchange process. The presence of functional groups such as —OH and —F may act as a capturing site for arsenic adsorption by an ion exchange reaction. This is evident from the XPS analysis, where As was captured by functional groups, such as —OH and —F groups. The arsenic will be attracted to the functional groups and undergo ion exchange. These groups are mostly negatively charged, forming Ti—As and O—As bonding.

Figure 14:
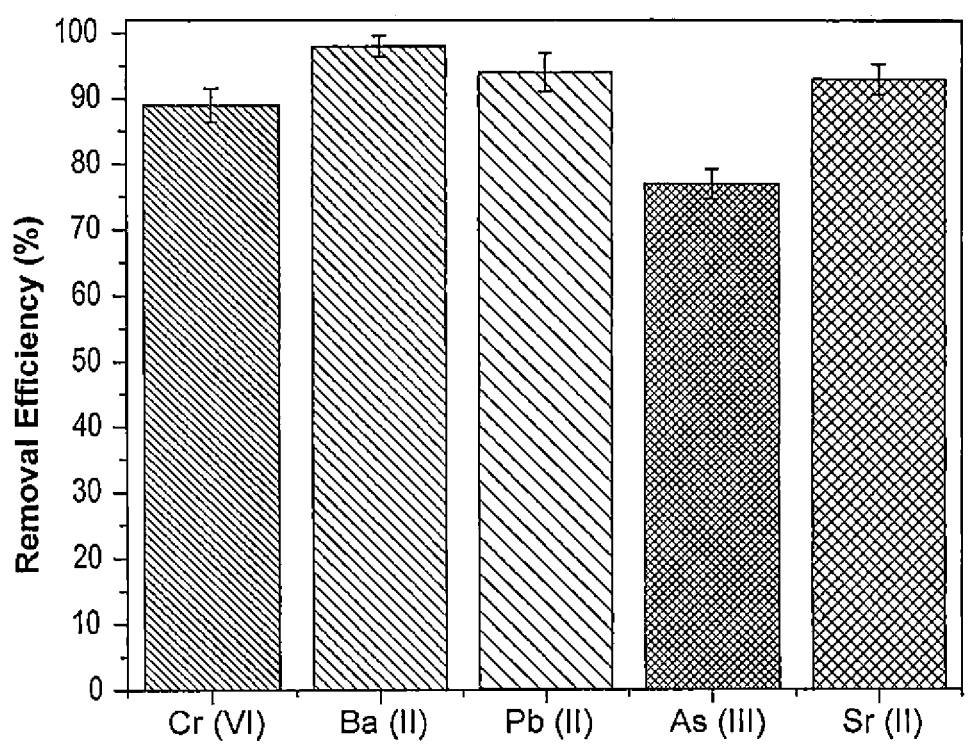
FIG. 14 is a graph comparing adsorption performances of the $Ti_3C_2$ two-dimensional metal carbide adsorbent for Cr (VI), Ba (II), Pb (II), As (III) and Sr (II) in a multiple-metal solution.

In order to challenge the adsorption of arsenic by the MXene, a solution containing As (III), Pb (II), Cr (IV), Sr (II) and Ba (II) with 1 ppm concentration was prepared. The MXene performance was tested under batch mode. The removal efficiency of the MXene for each ion is shown in FIG. 14. Generally, the presence of multiple contaminations in water creates adsorption competition and displacement between the adsorbates in the water and the adsorbent. Thus, different ions tend to occupy the active adsorption sites on the surface of MXene based on their selectivity and electrochemical potential of the material. By designing such experiments, the affinity of different ions under consideration can be examined. As illustrated in FIG. 14, arsenic removal was reduced only very slightly in the system of multi-ions (77%) compared to the system where only arsenic ions are present (88%). For other coexisting metal ions, the uptake of Ba (II) was around 98%, while Pb (II), Sr (II) and Ca (II) ions were removed by about 94%. The results in FIG. 14 showed that ions with two cationic charges have more affinity for being adsorbed by MXene compared to 3 or 5 cationic charges. Ba (II) was the dominant competing ion, whose species is very similar to the Pb (II) and Sr (II).

The distribution coefficient ($K_D$) can be used as a mathematical indication to demonstrate the selectivity and affinity of an ion towards an adsorbent. The distribution coefficient ($K_D$) is calculated as $$K_D = \frac{(C_i - C_e)}{C_e} \cdot \frac{V}{m},$$

where $C_i$ and $C_e$ are initial and equilibrium concentrations, respectively, V is the volume of solution, and in is the mass of adsorbent. The calculated distribution coefficient was in the following order: Ba>Sr>Ca>Pb>Cr>>As, with $K_D$ values of 68 mg/mL, 64.3 mg/mL, 63.9 mg/mL, 61.5 mg/mL, 36 mg/mL and 3.6 mg/mL, respectively.

As noted above with respect to FIG. 10, the MXene surface in the pH range above 2.41 is negatively charged, therefore ions with a higher electronegativity are adsorbed more by MXene compared to those with lower electronegativity. The electronegativities of As, Cr, Pb, Sr and Ba are 2.2, 1.56, 1.55, 0.99 and 1.04, respectively (As>Cr>Pb>Sr>Ba). Comparing the electronegativity values with the adsorption removal efficiencies in FIG. 14, the affinity of MXene to remove the multiple ions is in the order of Ba>Sr>Pb>Cr>As. Although, as per the electronegativity values the adsorption of arsenic should be higher, as noted above and as indicated by the distribution coefficient, the affinity of MXene to adsorb ions with two cationic charge is more than that of ions such as As with 3 cationic charges. Another factor is the surface charge of MXene, which is negative at pH 7 (i.e., mimicking drinking water) and the arsenic speciation at this pH is also negative, causing electrostatic repulsion and reduction in the adsorption. The presence of functional groups such as —OH and —F groups on the surface of MXene also play a role in attracting divalent ions compared to trivalent ions. This high arsenic adsorption in systems containing multi-ions is a promising result when considering systems under treatment which contain more than one ion within a complex chemical environment.

It is to be understood that the method of removing arsenic from a liquid is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of removing arsenic from a liquid, consisting of the steps of:
   providing an MXene, the MXene consists of $Ti_3C_2$ wherein the step of providing the MXene consists of room temperature exfoliation of Titanium (III) Aluminum Carbide (II) ($Ti_3AlC_2$) using hydrofluoric (HF) acid; and
   adding the MXene to a liquid, the MXene adsorbing arsenic from the liquid.

2. The method of removing arsenic from a liquid as recited in claim 1, wherein the liquid comprises water.

3. The method removing arsenic from a liquid as recited in claim 1, wherein the liquid comprises a solution including lead (Pb) and chromium (Cr (VI)).

* * * * *